United States Patent [19]
Davis et al.

[11] Patent Number: 5,883,713
[45] Date of Patent: Mar. 16, 1999

[54] ULTRA FAST FOURIER TRANSFORM SPECTROMETER WITH ROTATING SCANNING CUBE

[75] Inventors: John E. Davis, Claremont; Marion Todd, Redondo Beach, both of Calif.

[73] Assignee: Boeing North American, Inc., Seal Beach, Calif.

[21] Appl. No.: 931,421

[22] Filed: Sep. 16, 1997

[51] Int. Cl.$^6$ .................................................. G01B 9/02
[52] U.S. Cl. ........................................................ 356/346
[58] Field of Search ....................... 356/346; 250/339.07, 250/339.08

[56] References Cited

U.S. PATENT DOCUMENTS

| | | | |
|---|---|---|---|
| 3,482,919 | 12/1969 | Barringer | 356/346 |
| 4,286,877 | 9/1981 | Clarke | 356/346 |
| 4,654,530 | 3/1987 | Dybwad et al. . | |
| 4,684,255 | 8/1987 | Ford | 356/346 |

*Primary Examiner*—Samuel A. Turner
*Attorney, Agent, or Firm*—Harry B. Field; Steven E. Kahm

[57] ABSTRACT

A Fourier transform interferometer for rapid scanning of scenes such as explosions wherein an incoming beam of light to be analyzed is split by a beam splitter into a first portion and a second portion. The first portion of the incoming light is sent down one arm of the interferometer where it passes through a rotating scanning cube for changing the path length in that arm of the interferometer. The light is then reflected by a retro mirror and sent back through the scanning cube to the beam splitter for sending a portion of the returning beam to a detector. The second portion of the incoming light is sent down a second arm of the interferometer where it passes through a compensator. The light is then reflected by a retro mirror and sent back through the compensator to the beam splitter for sending a portion of the returning beam to a detector. The first and second portions of the incoming light having differing path lengths interfere and the detector measures the fringes created.

4 Claims, 2 Drawing Sheets

ULTRA FAST FOURIER TRANSFORM SPECTROMETER WITH ROTATING SCANNING CUBE

BACKGROUND OF THE INVENTION

1. Field of the Invention

This invention relates to interferometers and more particularly to Fourier transform interferometers having a rotary refractive window.

2. Description of the Related Art

One of the most common arrangements for performing the interferometric function is known as the Michelson Configuration which uses light interference in spectroscopy where two beams of light with separate optical paths are directed toward a common point forming interference fringes.

Dybwad, U.S. Pat. No. 4,654,530, issued Mar. 31, 1987, titled Refractively Scanned Interferometer discloses a window 30 which refractively changes the path length of a light beam. The window is rectangular which produces 4 spectrum scans per rotation.

Further Dybwad uses two arms of the interferometer traveling through the window for additively changing the path length of the light beams and compensating for non-linearities occurring in the window.

SUMMARY OF THE INVENTION

The invention presented herein shows a spectrometer having a square window for refractively changing the path length of the light passing though it. The square window configuration provides twice the scanning capability by providing 8 scans per window rotation. By doubling the number of scans per rotation, the number of scans per second can be increased and the duty cycle also increased, resulting in enhanced sensitivity while improving the ability to scan a target region quickly.

Only one arm of the light beams is diverted to the rotating window in the present invention which allows greater flexibility in setting the position of the zero burst position of the scan cube. This flexibility enables the designer to establish eight positions per revolution of the scan cube which provides zero burst signals which is twice the rate of other devices.

OBJECTS OF THE INVENTION

It is an object of the invention to provide for a fast spectrum scan of a scene for observing quickly changing scenes.

It is another object of the invention to limit mechanical noise and vibration in the interferometer.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
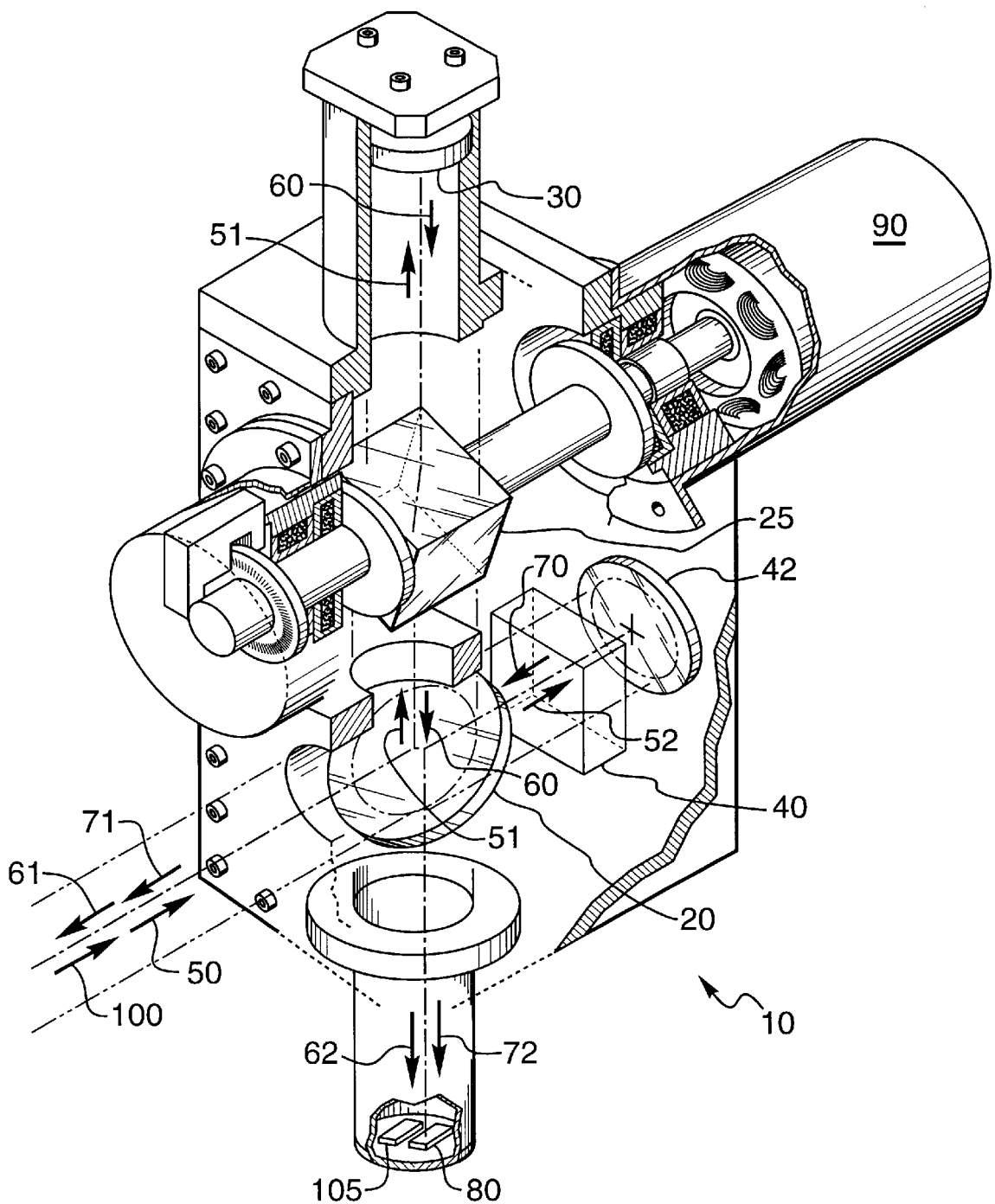
FIG. 1 is a phantomed perspective view of the Fourier transform spectrometer.
Figure 2:
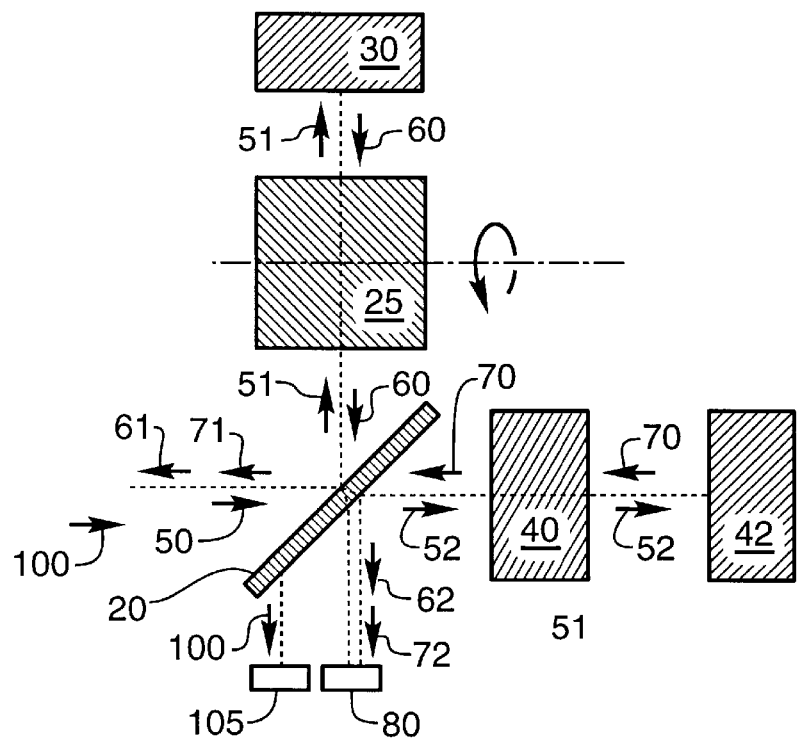
FIG. 2 is a schematic view of the optical path in the Fourier transform spectrometer.

Referring to FIG. 1 there is shown in general a Fourier transform spectrometer 10. As best seen in FIG. 2 a beam of light 50 enters the Fourier transform spectrometer 10 and is split by 50—50 beam splitter 20 into two equal beams 51 and 52. The light beam 51 is directed though scanning cube 25 which provides a refractive change in path length between the beams in the two arms of the interferometer. The beam 51 after its path length adjustment in the scanning cube 25 travels to retro mirror 30 which reflects beam 51 and returns it as beam 60 back down through the scanning cube 25 thereby making a double pass trough the scanning cube. The beam 60 then goes to the 50—50 beam splitter 20 which splits the beam 60 into beams 61 which is reflected out of the Fourier transform spectrometer 10 and beam 62 which is transmitted to the detector 80.

Beam 52 which was transmitted through the 50—50 beam splitter 20 goes to compensation block 40 for optically balancing the beams and then to retro mirror 42. Beam 52 is returned by retro mirror 42 as reflected beam 70 which passes through compensator block 40 to 50—50 beam splitter 20. Beam splitter 20 transmits beam 71 which travels out of the Fourier transform spectrometer 10 and reflects beam 72 which travels to detector 80.

Combined beams 62 and 72 gives a Fourier transform interferometer pattern as the scan cube 25 rotates.

Figure 3:
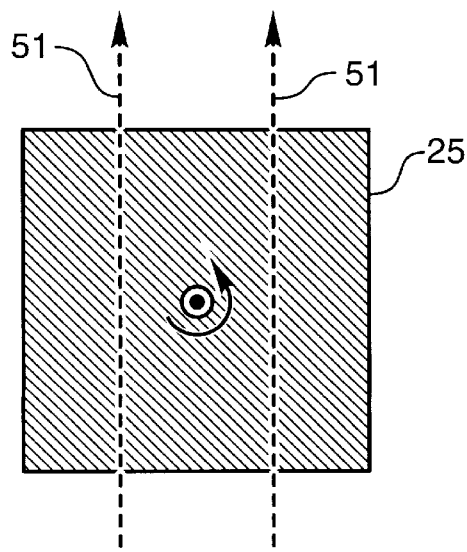
FIG. 3 is a side view of the rotating scan cube for changing the path length of light in one arm of the interferometer with the light incident perpendicular to the window.
Figure 4:
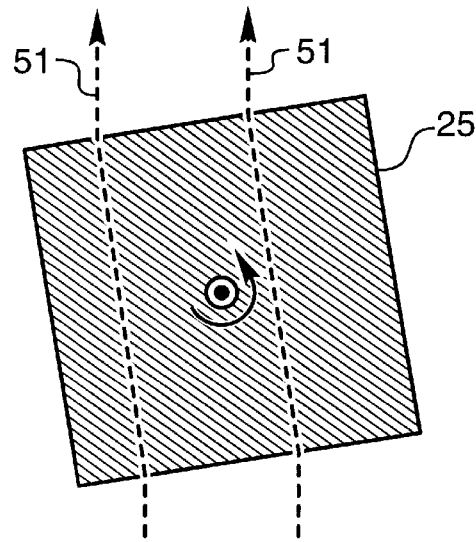
FIG. 4 is a side view of the rotating scan cube as in FIG. 3 with the window rotated and the path length changed.

FIGS. 3 and 4 show a comparison of the path lengths of beam 51 as the scan cube 25 rotates. The path length is increased in FIG. 4 thus changing the path length of the arm of the interferometer for interference fringes in the interferometer.

The scanning cube 25 is turned by motor 90 which can be a brushless D.C. torque motor with electromagnetic bearings for smooth, low vibration, long life operation at constant speed.

A reference laser beam 100 may be used to measure the optical difference between the two lengths of the arms in the interferometer by using a reference detector 105. The reference detector provides a readout when the path length between the optical paths interfere with each other. The wavelength of the reference system is characteristically much shorter than the shortest desired scene wavelength since the zero path difference between the scan cube 25 and the compensation block 40 is adjusted to give both greater and lesser path lengths as the scan cube 25 rotates.

The housing containing the interferometer is small allowing easy integration into a systems optical package.

The focal plane, whether it be for scanning a scene or staring at a scene, must be designed for very short frame times. The time required to read out the array will limit the speed of the rotating element.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An interferometer comprising:
    a beamsplitter for partly reflecting and partly transmitting an incoming light beam creating a reflected incoming light beam and a transmitted incoming light beam;

a first arm of the interferometer containing a rotating scanning cube for changing the path length of the reflected incoming light beam, and a retro mirror for reflecting the reflected incoming light beam back through the scanning cube to the beamsplitter;

a second arm of the interferometer containing a compensator for optically balancing the transmitted incoming light beam and a retro mirror for reflecting the incoming beam back through the compensator to the beamsplitter, wherein the reflected and transmitted light beams in the first and second arms of the interferometer are incident on the beam splitter on their return trip from their respective retro mirrors and combine to form an input beam for a detector.

2. An interferometer as in claim 1 wherein:

a laser reference source is incorporated to enhance the ability to measure exact relative path differences between the two optical legs.

3. An interferometer as in claim 1 wherein:

the detector is a linear array enabling the use of the unit as a scanning ultra spectral radiometer.

4. An interferometer as in claim 1 wherein:

the detector is a two dimensional array enabling the use of the unit as a staring ultra spectral radiometer.

* * * * *